Patented July 17, 1923.

1,461,918

UNITED STATES PATENT OFFICE.

FREDERICK LAIST, OF ANACONDA, MONTANA, ASSIGNOR TO ANACONDA COPPER MINING COMPANY, A CORPORATION OF MONTANA.

HYDROMETALLURGICAL PRECIPITATION OF COPPER.

No Drawing.    Application filed April 20, 1920.   Serial No. 375,261.

*To all whom it may concern:*

Be it known that I, FREDERICK LAIST, a citizen of the United States, residing at Anaconda, in the county of Deerlodge and State of Montana, have invented certain new and useful Improvements in Hydrometallurgical Precipitation of Copper, of which the following is a specification.

It is well known that metallic copper, more or less admixed with copper salts or compounds, may be precipitated from solutions of cupric sulfate by reacting thereon with sulfur dioxid. In so far as the copper is precipitated in metallic state the reaction is assumed to involve as a first stage the formation of so-called cupro-cupric sulfite, which in a further reaction stage breaks down into metallic copper and sulfuric acid. The reaction, in so far as it proceeds to completion, may be represented by the equation:

$$CuSO_4 + SO_2 + 2H_2O = Cu + 2H_2SO_4.$$

This reaction is commonly carried out by heating the copper sulfate solution under pressure to the reaction temperature, say 125° C. or upward, and then introducing sulfur dioxid as long as copper is precipitated. As thus carried out the reaction is never complete so far as the copper contents of the solution are concerned; and moreover the precipitate, which is of a reddish brown non-metallic appearance, is seldom if ever free from contamination by sulfur, probably present as cuprous sulfite or cuprocupric sulfite. Such contamination is of course highly objectionable from the metallurgical viewpoint.

The object of this invention is the provision of a novel and improved method for precipitating copper from its solutions through the agency of sulfur dioxid.

I have discovered that greatly improved results are obtained if the total quantity of sulfur dioxid corresponding to the copper to be precipitated (which may be about 50–65% of the total copper content of the solution, according to the pressure and other reacting conditions) is introduced into the solution, maintained under appropriate pressure, at a temperature below that at which any substantial precipitation occurs, and the solution is thereafter heated under pressure to a suitable reacting temperature. While my invention is not limited to any particular operating conditions, it may be satisfactorily carried out by introducing into a copper sulfate solution carrying about 40 grams of copper per liter, and maintained at a temperature of about 100° C. or somewhat less, approximately 20–30 grams of sulfur dioxid per liter of the solution. The solution, which is thus charged with sulfur dioxid while in a closed vessel, is thereafter heated under pressure to a temperature at which the desired reaction readily and rapidly occurs, the preferred temperature being in the neighborhood of 150–160° C. Under these conditions some 50–65% of the total copper content of the solution is precipitated in the form of a copper deposit having a bright metallic lustre and substantially or entirely free from sulfur compounds.

It is preferred that the sulfur dioxid content of the solution, before the reaction has occurred, should be in substantial excess (say around 10% excess) of the quantity theoretically required for the precipitation of the precipitatable copper content of the solution. As above stated this precipitatable copper content usually amounts to about 50–65% of the total copper content according to the concentrations, temperatures and pressures chosen as operating conditions. The reaction involving the precipitation of metallic copper appears to begin slowly at temperatures in the neighborhood of 110° C., but I prefer to utilize decidedly higher temperatures than this, as above indicated.

In case the solution contains ferric iron there will of course occur a corresponding oxidation of sulfur dioxid to sulfuric acid as the iron undergoes reduction; and naturally therefore the ferric contents of the solution must be taken into account in calculating the proportion of sulfur dioxid to be added.

While no definite rules can be laid down, it may be stated that in general from 0.6 to 1.0 pound of sulfur dioxid should be introduced into the solution for each pound of copper therein, when the adjustment of the conditions (pressure, temperature, concentration, etc.) is such as to procure a precipitation of from 50–65% of the total copper content.

A decided economy of installation and operation, which constitutes a further portion of my invention, consists in introducing the sulfur dioxid in liquid phase into the copper-bearing solution, in which it immediately dissolves to the extent of its solubility at the pressure and temperature employed. Accordingly, the sulfur dioxid is delivered from cylinders or other packages in which it is held in liquefied state, but instead of vaporizing the sulfur dioxid outside of the reaction vessel, it is delivered in liquid phase directly into the solution. By proceeding in this manner it is not only practicable to employ relatively small and inexpensive fittings such as valves, piping and the like, but the entire quantity of sulfur dioxid required for the subsequent reaction may be very quickly introduced into the solution. In this way all danger of the occurrence of intermediate reactions giving rise to sulfur compounds in the final product is avoided.

I claim:—

1. Method of precipitating metallic copper from solutions comprising introducing into the solution maintained under appropriate superatmospheric pressure and at a temperature below that at which substantial reaction occurs sulfur dioxid in quantity more than would be sufficient to saturate the solution at atmospheric pressure, and thereafter raising the temperature to effect the precipitation of copper, whereby metallic copper substantially free from sulfur compounds is obtained.

2. Method according to claim 1 in which the sulfur dioxid is introduced into the solution in liquid phase.

3. Method of precipitating metallic copper from solutions, comprising charging the solution, under pressure but at a temperature below that at which substantial reaction occurs, with sulfur dioxid in proportion not less than six-tenths by weight of the total copper content of the solution; and thereafter raising the temperature of the solution to effect precipitation of copper, whereby metallic copper substantially free from sulfur compounds is obtained.

4. Method of precipitating metallic copper from solutions, comprising charging the solution, under pressure but at a temperature not substantially exceeding 100° C., with sulfur dioxid in proportion not less than six-tenths by weight of the total copper content of the solution; and thereafter raising the temperature of the solution to approximately 150–160° C., to effect precipitation of copper, whereby metallic copper substantially free from sulfur compounds is obtained.

5. In a method of precipitating copper from solutions thereof by sulfur dioxid, the step which consists in introducing sulfur dioxid in liquid phase into the copper-bearing solution.

In testimony whereof I affix my signature.

FREDERICK LAIST.